(12) United States Patent
Barnwell et al.

(10) Patent No.: US 11,726,353 B2
(45) Date of Patent: Aug. 15, 2023

(54) PAPRDOLL EYEWEAR APPLIQUE SYSTEM

(71) Applicants: Elizabeth Barnwell, Dallas, TX (US); Maria Moore Barnwell, Dallas, TX (US)

(72) Inventors: Elizabeth Barnwell, Dallas, TX (US); Maria Moore Barnwell, Dallas, TX (US)

( * ) Notice: Subject to any disclaimer, the term of this patent is extended or adjusted under 35 U.S.C. 154(b) by 173 days.

(21) Appl. No.: 17/025,686

(22) Filed: Sep. 18, 2020

(65) Prior Publication Data

US 2021/0080756 A1    Mar. 18, 2021

Related U.S. Application Data

(60) Provisional application No. 62/901,888, filed on Sep. 18, 2019.

(51) Int. Cl.
*G02C 11/02* (2006.01)
*B32B 29/06* (2006.01)

(52) U.S. Cl.
CPC .............. *G02C 11/02* (2013.01); *B32B 29/06* (2013.01); *B32B 2451/00* (2013.01)

(58) Field of Classification Search
CPC ......... G02C 11/02; G02C 5/008; B32B 29/06; B32B 2451/00; B29D 12/02; B33Y 80/00
USPC ...................................................... 351/41, 51
See application file for complete search history.

(56) References Cited

U.S. PATENT DOCUMENTS

| 7,036,929 B1* | 5/2006 | Harvey | G02C 7/086 |
| | | | 351/159.02 |
| 2015/0331261 A1* | 11/2015 | Mikolajczak | C09J 5/00 |
| | | | 156/60 |
| 2017/0153465 A1* | 6/2017 | Jarvis | G02C 11/02 |

OTHER PUBLICATIONS

Radhika Seth, Sticker 3D Vision, Apr. 16, 2012, Yd Yanko Design (https://www.yankodesign.com/2012/04/16/sticker-3d-vision/).*

* cited by examiner

*Primary Examiner* — Tuyen Tra
(74) *Attorney, Agent, or Firm* — Kandace Walter

(57) ABSTRACT

A device and method for altering the appearance of any eyeglasses by generating and applying an eyewear appliqué. Users may alter the façade of eyeglasses without the cost of new glasses. Users may create a profile including a frame scan file from a camera or scanner and specific design elements to create a vector file that is processed by the appliqué application to produce an appliqué with alternative design elements. The appliqué application produces an appliqué from the scan file and user preferences. The appliqué is peeled from the release liner to and then pressed onto the user's frame to create the newly designed eyewear appliqué and custom look. The adhesive used in the production process allows the eyewear appliqués to be removed from frames and reapplied multiple times. The user can easily remove an eyewear appliqué by peeling and replacing it with another for an alternative look.

1 Claim, 9 Drawing Sheets

PAPRDOLL EYEWEAR APPLIQUE SYSTEM

FIELD OF THE INVENTION

The present disclosure relates generally to a device and application for a method that develops an electronic rendering of the surface area of any eyeglass frame and creates an appliqué, a cosmetic apparatus, that attaches to any eyeglass frame, thereby creating a customized, temporary or permanent look for an eyeglass frame.

BACKGROUND

In 2014, over 71.5 million pairs of prescription eyeglasses were sold in the United States at the retail level. Most eyeglass consumers are primarily concerned with functionality and features designed to correct vision and improve eye health. A growing segment also considers fashion an important consideration in making a purchase decision. Further, nearly one-fourth of adults in the United States have worn eyeglasses without a prescription lens for the purpose of fashion.

The cost of spectacle lenses and the frames holding such lenses can be very expensive. Prescription lenses made of special materials and select coatings can also add considerable cost. Depending on the quality, style and brand, frames can be expensive—nearly half of consumers are not willing to pay more for expensive designer frames. The overall cost of eyeglasses prohibits most people from buying a second or third pair for the purposes of convenience or fashion. Given these considerations, many eyeglass wearers update their eyewear once every year or two depending on their insurance coverage, disposable income and selection of optical retailer.

In terms of fashion and personal expression many eyeglass consumers are forced to 1) choose a frame color/design that matches a limited number of outfits they own or 2) select a frame of neutral color to coordinate with additional outfits. Given the expense, most eyeglass users are unable or unwilling to purchase multiple pairs of glasses to match various outfits as they might do with other wardrobe items such as footwear or jewelry.

To address the desire to alter the appearance of eyeglasses without incurring substantial expense, some users may consider decorative attachments such as those offered by Jarvis or Mikolajczak. Both options provide a sheet of precut decorations for attachment to the temple leg, front face portion or bridge of the eyeglass frame. These users are limited to the items on the preprinted adhesive sheet. Some producers, such as Hodgson, use adhesive films to decorate the lenses. Consumers may also buy sheets of decorative elements and cut them to match the desired eyeglass frame. These attachments may be secured with magnets or clips (Jin or Ling) or adhesive coatings (Jin). The processes and methods designed by these producers to customize and create a unique personalization require substantial effort on the part of the consumer. Further, options for customization are limited by what the manufacturer chooses to offer. Additionally, some brands offer customization for eyeglasses but only for those frames that have been produced in-house for that manufacturer. The products offered by these prior art producers does not provide a device or method for nearly instantaneous customization for any frame and not just the frame produced by a certain manufacturer.

The present disclosure, produced using information technology, smart devices and advanced materials, provides instant, economical and nearly unlimited eyewear style options for consumers. Using the products and methods of the present disclosure, consumers may obtain a completely new fashion or style without visiting a retailer or purchasing an entirely new pair of eyeglasses. The consumer may control and alter the appearance of their eyeglasses on a whim without regard to the manufacturer or style of the frame. The present disclosure transforms an ordinary pair of glasses into style-on-a-whim wear and serves as both a stylish fashion accessory for the user's face as well as a compliment to their existing wardrobe. Under the present disclosure, users may purchase as few or as many of the items as they choose for future use and constantly change the appearance of their eyeglasses.

OBJECTIVES

An object of the present disclosure is to provide a device and method for a user to customize colors and styles for eyewear.

An object of the present disclosure is to provide a device and method for a user to cosmetically alter any pair of eyeglass frames currently in the marketplace, as well as, future eyeglass frames yet to be manufactured.

Another object of the present disclosure is to provide a device for the temporary customization of a pair of glasses.

Another object of the present disclosure is to provide a customized adhesive appliqué for glasses that may be easily applied, removed and re-applied multiple times to a pair of glasses.

Another object of the present disclosure is to provide a customized adhesive appliqué for glasses that will not damage the base pair of glasses during use or removal.

Another object of the present disclosure is to provide an unlimited selection of customizations.

Another object of the present disclosure is to provide a customization device for any pair of glasses without regard to the shape, brand or style of frame.

Another object of the present disclosure is to provide a ready to wear customization device for the entire glasses frame.

Another object of the invention is to provide a substrate to attach technology to eyewear frames.

Another object of the invention is to incorporate smart eyewear technologies licensed from third party developers to the eyeglasses appliqués.

Another object of the present disclosure is to provide ecological integrity through a sustainable fashion process.

Another object of the present disclosure is to address the sustainable fashion movement, which is a movement and process of fostering change to fashion products and the fashion system towards greater ecological integrity, as it relates to the optical industry.

Another object of the present disclosure is to provide a separation tab to enhance ease-of-use in separating the appliqué from the release liner paper protecting the adhesive side of the appliqué.

SUMMARY

The present invention discloses an eyewear appliqué production system ("appliqué system") and application to cosmetically alter the surface portion of any standard base pair of eyeglasses (sun, fashion, or prescription). An appliqué is defined herein as a decal or sticker that can be attached, removed and repositioned against a surface such as the eyeglass frame, in this embodiment. An appliqué is a removable and re-positionable decal with adhesive and a backing or release liner to protect the adhesive until the appliqué is positioned on the frame. The present invention describes two methods to generate and produce appliqués: by using data derived from a 3D scan file or using data derived from 2D images manually entered by a user. The appliqué method involves a proprietary process for surfacing the frame and translating the surface into a customized appliqué that precisely fits the user's eyeglass frame. The present invention also discloses technology via a creation application that automates the appliqué method, via personal device such as smart device, mobile phone, or personal computer, to produce a customized appliqué for an eyeglass frame. The appliqué easily attaches and detaches from the surface of the pair of eyeglasses at the inclination of the wearer for the purpose of changing the stylistic appearance of the glasses at the wearer's whim. The user may choose to generate appliqués for the front face of the frame or temples of the frame or both portions of the eyeglass frames.

A user of the present appliqué system inputs style information into the appliqué creation application ("application") where that user input is compared and cross-referenced with the existing library of appliqués. The present application collects and stores a library of scanned frames through uploaded user frame scan files that will be available to future users as well as existing users. While many frame scan files are uploaded from users, some frame scan files may be sourced directly from the frame manufacturer. The frame scan files stored in memory are created by capturing the surface of a chosen frame through a three-dimensional scan or high-resolution images. The frame appliqué file is created from the frame scan files by outlining the profile of said chosen frame from the scan/images and exporting the profile, in a format such as a vector file, to be used by the application to manufacture the appliqué. In the present disclosure, outlining the profile refers to the creation of an electronic rendering of the surface area of the frame that is used to create an outline of the surface area of the frame in vector format. This frame appliqué file is stored in memory in the appliqué library. This vector file is then read by the manufacturing machine, such as flash cutter, water jet, die cutter or other subtractive manufacturing machine, or additive manufacturing machine such as a 3D printer, or injection molding machine to create the appliqué.

A user would input the brand, size and style of their frame into the appliqué application, where that information is cross-referenced with the existing library of potentially compatible appliqués, i.e. frame appliqué files, matching the user's frame. If the appliqué application finds a match for the frame appliqué file within the library, then that user would forego the scanning process and move ahead to selection of specific appliqué design elements such as color, texture, cosmetic shape and material. If there is no pre-existing compatible frame appliqué file matching the user's desired brand, size and style of frame, then the user would need to input their frame specifications into the appliqué application and proceed to scanning the user's frames and desired design elements. Once the appliqué creation/selection process is completed according to the user's specifications, the appliqué application will produce the appliqué using the methods described herein. Appliqués may be produced by the inventor using the appliqué application or alternatively, by optical providers with the application and proper manufacturing equipment or users who have the application downloaded to their smart phone or otherwise licensed the technology.

Appliqué files, typically in vector format, are generated/derived from either a three-dimensional (3D) scan or two dimensional (2D) images. To create the appliqué file using a 3D scan process, an eyeglass frame is scanned by an industrial grade 3D blue light scanner, a spatial scanner, a smart device camera, hand-held scanner or other more advanced scanning technology that will capture shiny objects having smooth surfaces. This scanned frame file data will then interface directly a 3D processing software suite, such as with Geomagic Wrap, or another similar software that compiles scan data together, processing it into a useful spatial data file. Geomagic Wrap or other similar software will then be used to register (algorithmically align) and then merge the point clouds of the scan data resulting in an STL file. Then 3D processing software will be used to "surface" a part, by adding a NURBS (nonuniform rational basis spline, which is a mathematical model commonly used in computer graphics for generating and representing curves and surfaces) patchwork surface over the top of the surface, to build out a visual representation of an object's exterior and contours. The surfaced file is imported into CAD software. such as UGS NX or Solidworks but a variety of CAD software systems will achieve a similar result and a vector file (appliqué file) is created in CAD for an outline.

In order to create an appliqué file using the two-dimensional (2D) image process, 2D image(s) of the substrate frame taken with a high resolution camera are utilized to determine the scale of the images using appropriate geospatial, or if warranted, photogrammetry (the extraction of complex 2D and/or 3D measurements from 2D data i.e. images; for example, the distance between two points that lie on a plane parallel to the photographic image plane can be determined by measuring their distance on the image) software and methodologies. Once scale of frame is determined, then the resultant frame image(s) are imported into Photoshop. Illustrator or another design software with similar functionality. Utilizing design software functionality, an outline of the eyeglass frames is created via common tools such as the pen tool, magic wand tool, or a similar tool to outline the edges of the frame.

Then to prepare for the production run, the appliqué material, which is made of vinyl, paper, acrylic or other amenable material, is prepared by applying an adhesive (adhesive tape or adhesive liquid or a similar material with adhesive properties) and release liner paper to the back of appliqué material. Then the outline profile is exported to a file type, such as but not restricted to STL, DXF, DWG or other similar file type, for use by the manufacturing machine. However, in instances where 3D printing or injection molding are used to produce the appliqués, adhesive is applied after the appliqué is created.

However, within the appliqué application, after an appliqué is chosen and design elements are selected, the appliqué file in vector or other applicable format, which matches the previously selected user personalization data, is interpreted by the manufacturing machine to create the appliqué, which is hand embellished as needed and delivered/presented to the user. Once the user receives their personalized appliqué, the user would use the appliqué release liner tab to grasp the appliqué release liner, peel the release liner from the appliqué, align the appliqué with the frame, and press the appliqué firmly into place against the frame for a new, fully customized look.

BRIEF DESCRIPTION OF THE DRAWINGS

For a more complete understanding of this disclosure and its features, reference is now made to the following description, taken in conjunction with the accompanying drawings, in which.

FIGURE REFERENCE NUMBERS

Figure 1:
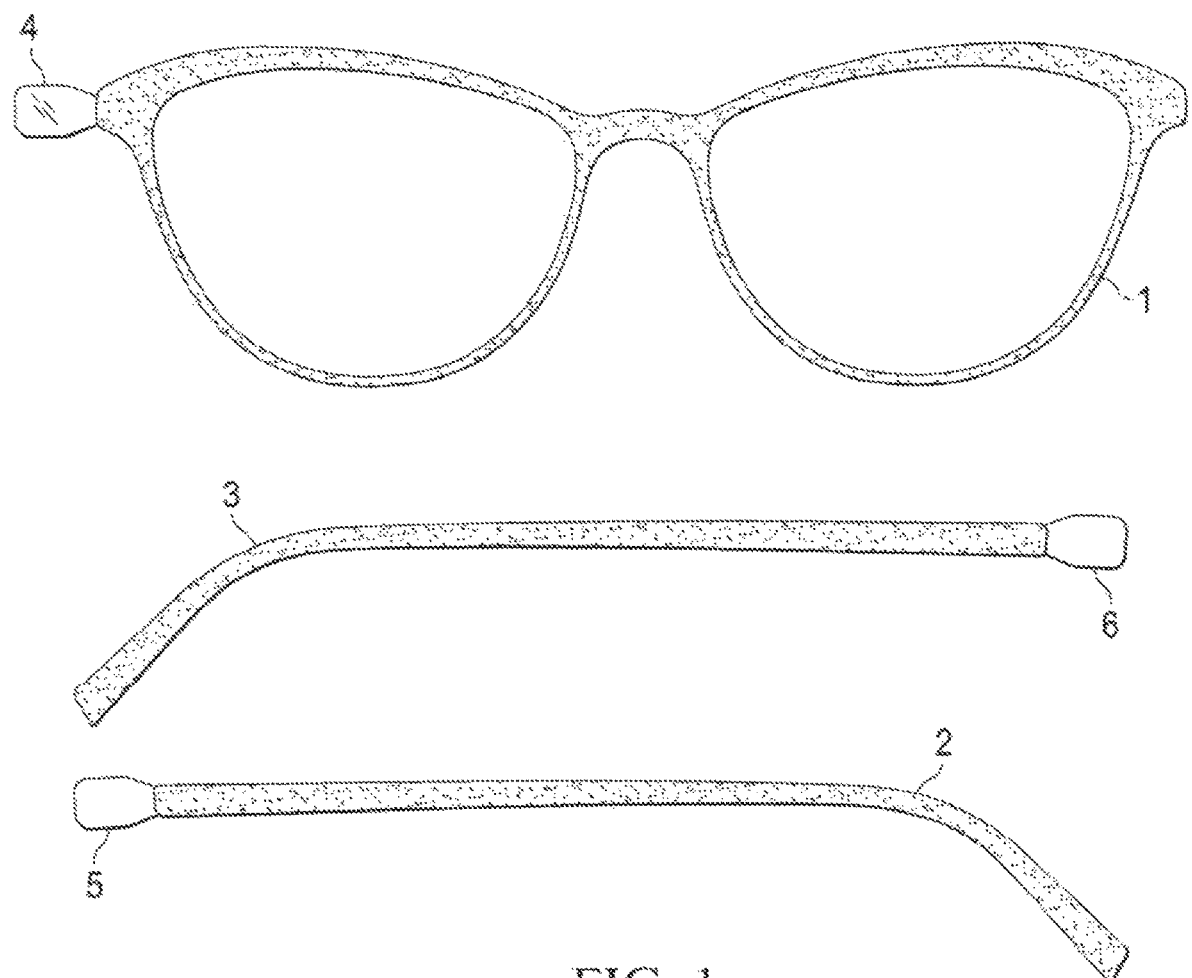
FIG. 1 shows a front perspective view of the eyewear appliqué system.

1. Frame face appliqué
2. Left temple appliqué
3. Right temple appliqué
4. Release liner tab on frame
5. Release liner tab on left temple
6. Release liner tab on right temple
7. Release liner on frame
8. Release liner on left temple
9. Release liner on right temple
10. Frame face front
11. Left temple frame
12. Right temple frame
13. Frame face appliqué (unique)
14. Release liner tab of unique frame
15. Release liner of unique frame

DETAILED DESCRIPTION

FIG. 1 shows a top perspective view of the eyewear appliqué system featuring the appliqué with release liner tabs. The appliqué is indicated by speckles on the front facing side of the frame face or frame face front. The release liner paper or backing is positioned on the back side of the appliqué (not shown) and an adhesive layer is between the release liner paper and the appliqué (not shown). The release liner on the frame face appliqué 1 has a release liner tab 4 that the user would pull to remove the release liner from the back of the frame face appliqué 1. The release liner of the left temple also has a release liner tab 5, which may be pulled to remove the release liner from the back of the left temple appliqué 2. The release liner of the right temple also has a release liner tab 6, which may be pulled to remove the release liner from the back of the right temple appliqué 3.

Figure 2:
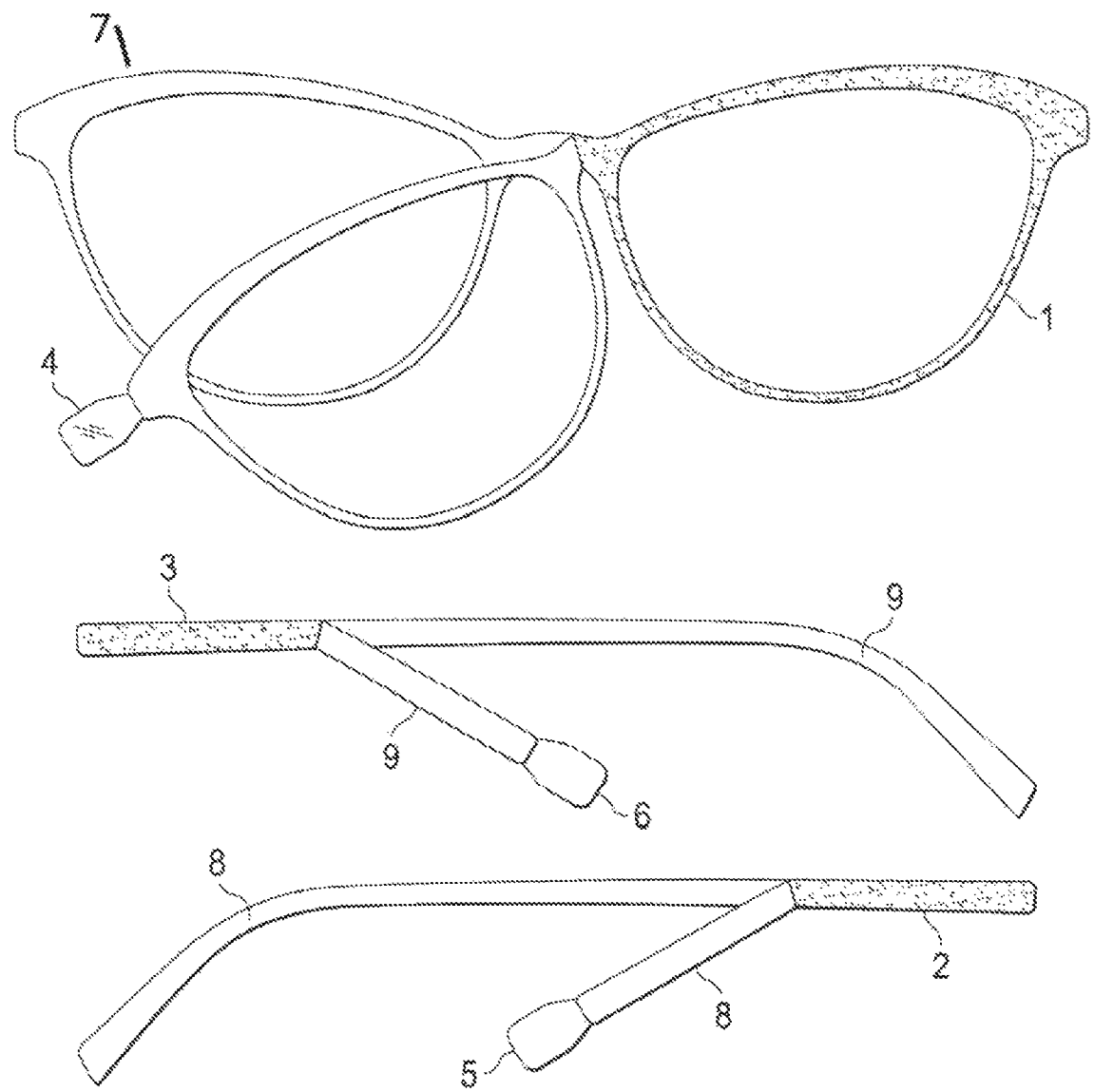
FIG. 2 shows a rear view of the eyewear appliqué system.

FIG. 2 shows a rear view of the eyewear appliqué system featuring the appliqué and release liner paper or backing with release liner tabs. The appliqué is indicated by speckles on the rear facing side of the frame face. The release liner paper or backing is positioned on the back side of the appliqué and is folded back to reveal the appliqué with adhesive layer, which is between the release liner paper and the appliqué. The release liner on the frame face appliqué 7 has a release liner tab 4 that the user would pull to remove the release liner from the back of the frame face appliqué 1. The release liner of the left temple 8 also has a release liner tab 5, which may be pulled to remove the release liner from the back of the left temple appliqué 2. The release liner of the right temple 9 also has a release liner tab 6, which may be pulled to remove the release liner from the back of the right temple appliqué 3.

Figure 3:
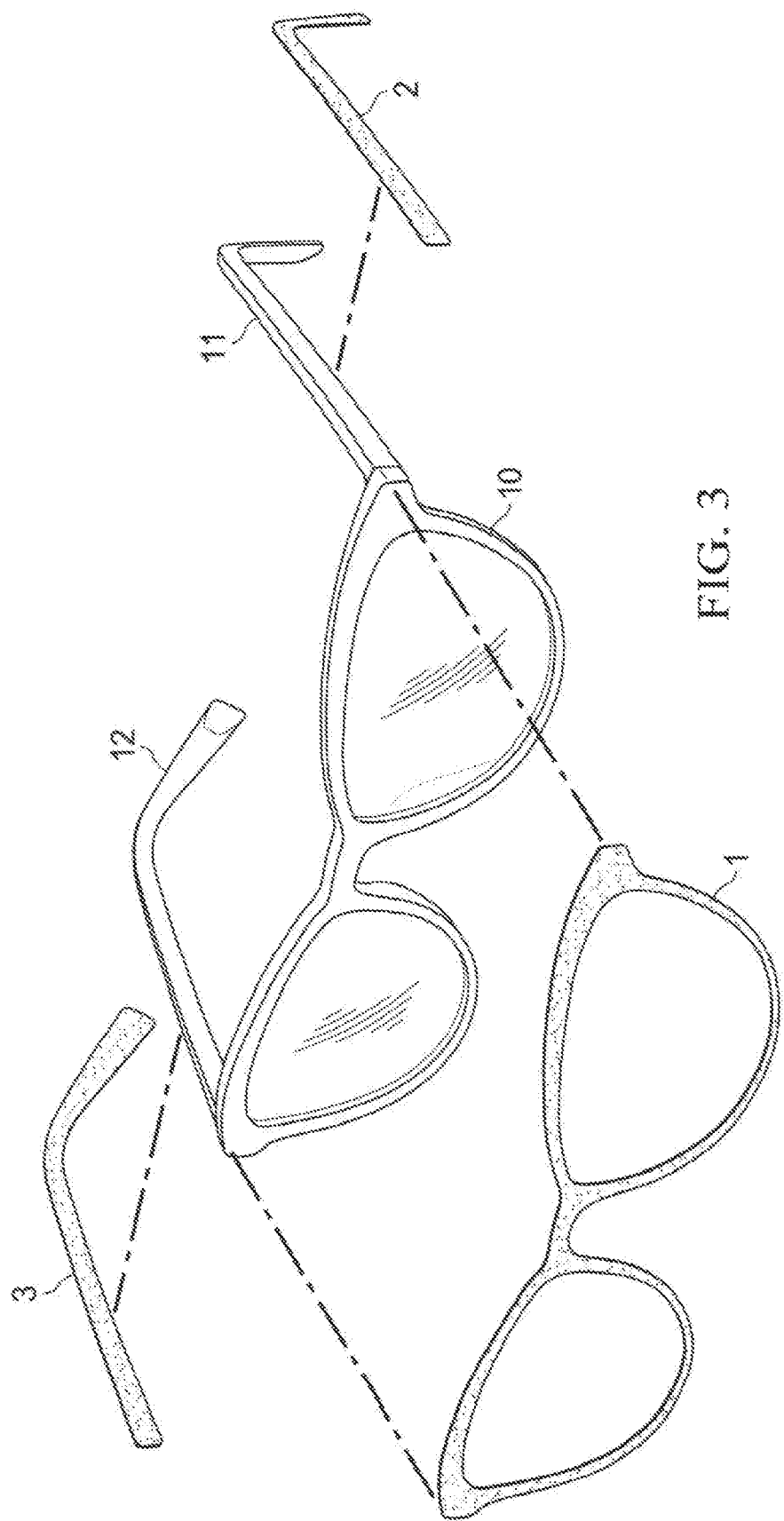
FIG. 3 shows side perspective view of the eyewear appliqué system, components separated.

FIG. 3 shows side perspective view of the eyewear appliqué system with components separated, said components being a standard eyeglass frame with frame face portion 10, a left temple portion 11 and a right temple portion 12, frame front appliqué 1, left temple appliqué 2, and right temple appliqué 3. The adhesive layer, release liner paper and release liner tabs are not visible in this view. The eyewear appliqué system is fully customizable for each user's pair of glasses. The eyewear appliqué system is shaped to mimic the frame surface and cover the frame face front 10 or frame front 10 and/or temples (11/12) of the eyeglasses frame. The appliqué may be customized by the user with various design elements such as color, texture, shape, material, and quantity. These specific design elements form the user personalization data for each specific user within the appliqué application.

Once the eyeglasses frame is scanned, all of the frame brand, size and style data is collected, and an appliqué file is created, in vector or other applicable format, the appliqué file is fashioned or formed from adhesive-backed material to produce the appliqué. The appliqué may be secured to the front of the eyeglasses frame 10 to customize that particular pair of frames. If the user has chosen temple appliqués 2/3, then those appliqués may also be secured to the temples of the frame. A user may decide between one (frame or temple), two (frame and temple or two temples) or three (frame and two temples) appliqués to customize the user's frame using the appliqué system or application. The appliqué may be quickly separated from the protective release liner paper or backing, which is a paper coated with a release agent used for protection of adhesive surfaces of various adhesive products by pulling a tab attached to the protective release paper. Adhesive materials are not shown in these figures. Once the protective release liner paper tab (4/5/6) is pulled and the adhesive backing on the back of the appliqué is exposed (7/8/9), the adhesive backing may be pressed against the frame to create a new appearance for the frame. The appliqué pieces are shown with speckles only to distinguish the appliqué from the frame in these figures.

Figure 4:
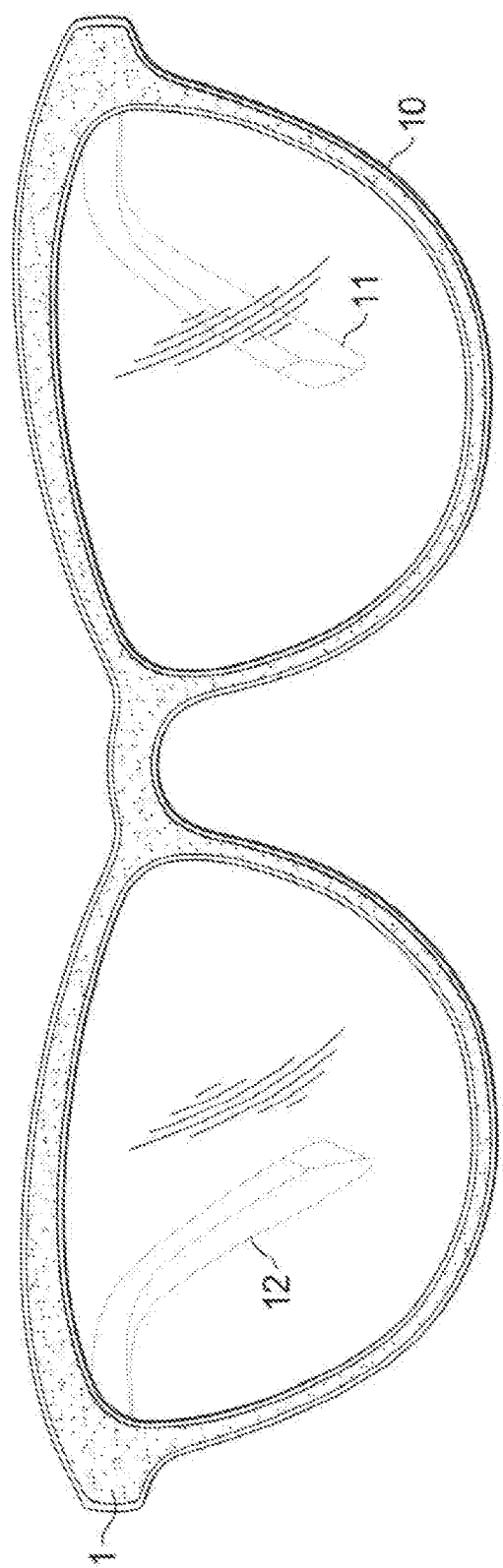
FIG. 4 shows a front view of the eyewear appliqué system, components attached.

FIG. 4 shows a front view of the eyewear appliqué system with appliqué and a standard eyeglasses frame attached. Once a user has either chosen an existing file from the appliqué library within the appliqué application or scanned the user's desired frame into the appliqué application to produce a compatible appliqué, once produced, the appliqué may be applied to the user's frame. The appliqué 1 attached to the front of the frame 10 is shown in this view. The right temple frame 12 and left temple frame 11 are on the right and left side of the frame face front 10, respectively. Temple appliqués are not visible in this view.

Figure 5:
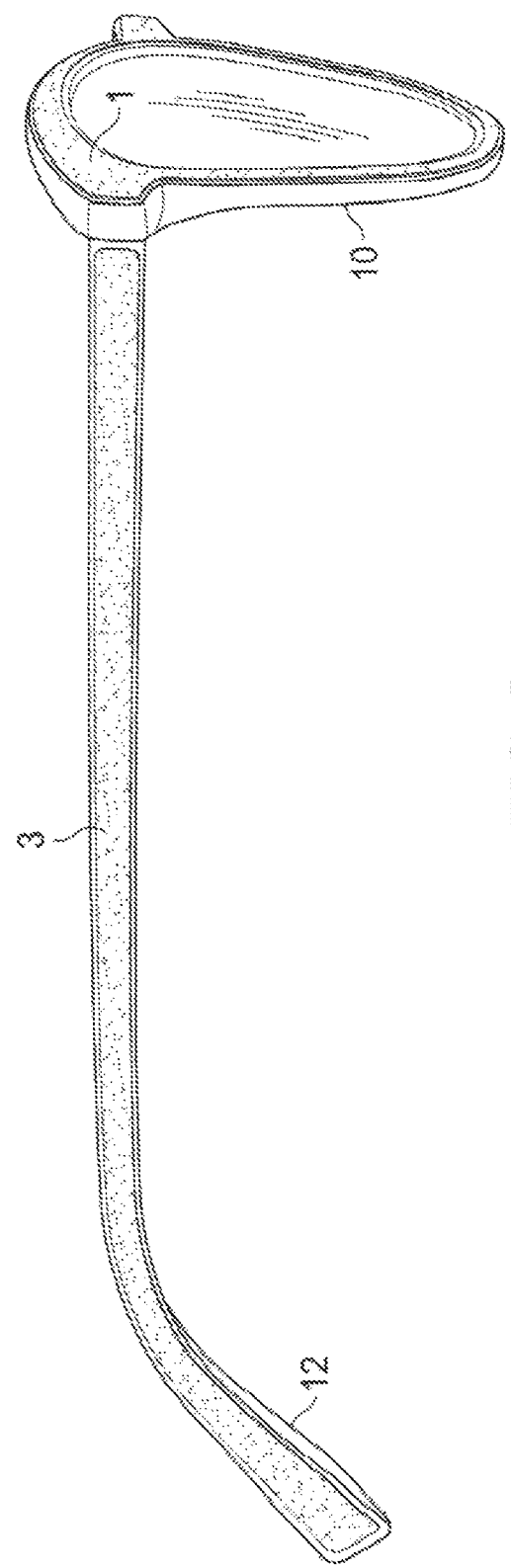
FIG. 5 shows a right-side view of the eyewear appliqué system.
Figure 10:
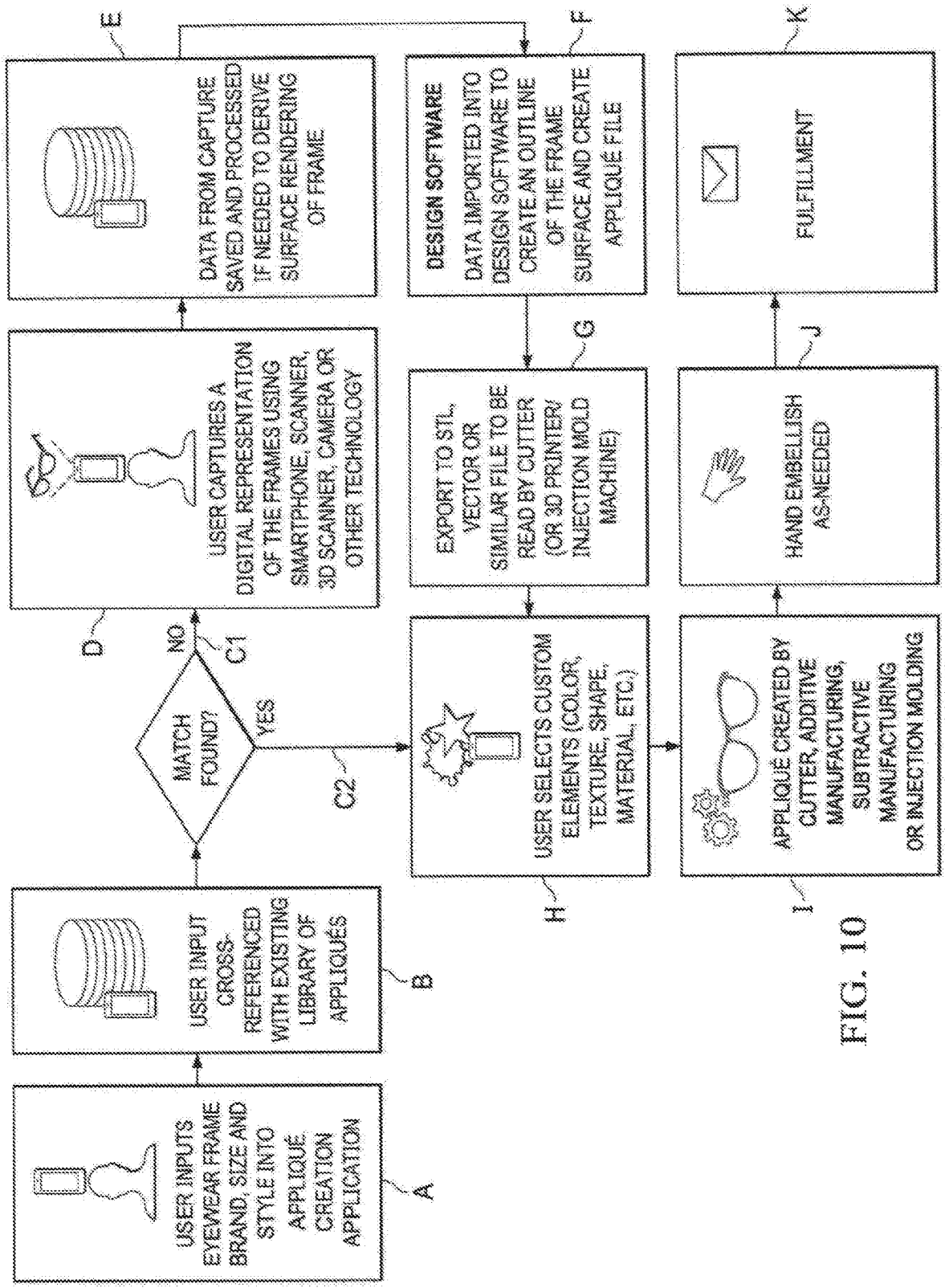
FIG. 10 shows an overview of the eyewear appliqué application.

FIG. 5 shows a right, side view of the eyewear appliqué system with appliqué and a standard eyeglasses frame. In this view, the side of the frame front 10 with appliqué 1 and right temple 12 with right temple appliqué 3 are shown. Once the appliqué is produced by the appliqué application (as shown in FIG. 10), the user will use the release liner tab to remove the appliqué from the protective release paper. The exposed appliqué may be pressed against the frame face and frame right temple to change the appearance of the frame. The left temple and optional appliqué are not shown in this view.

Figure 6:
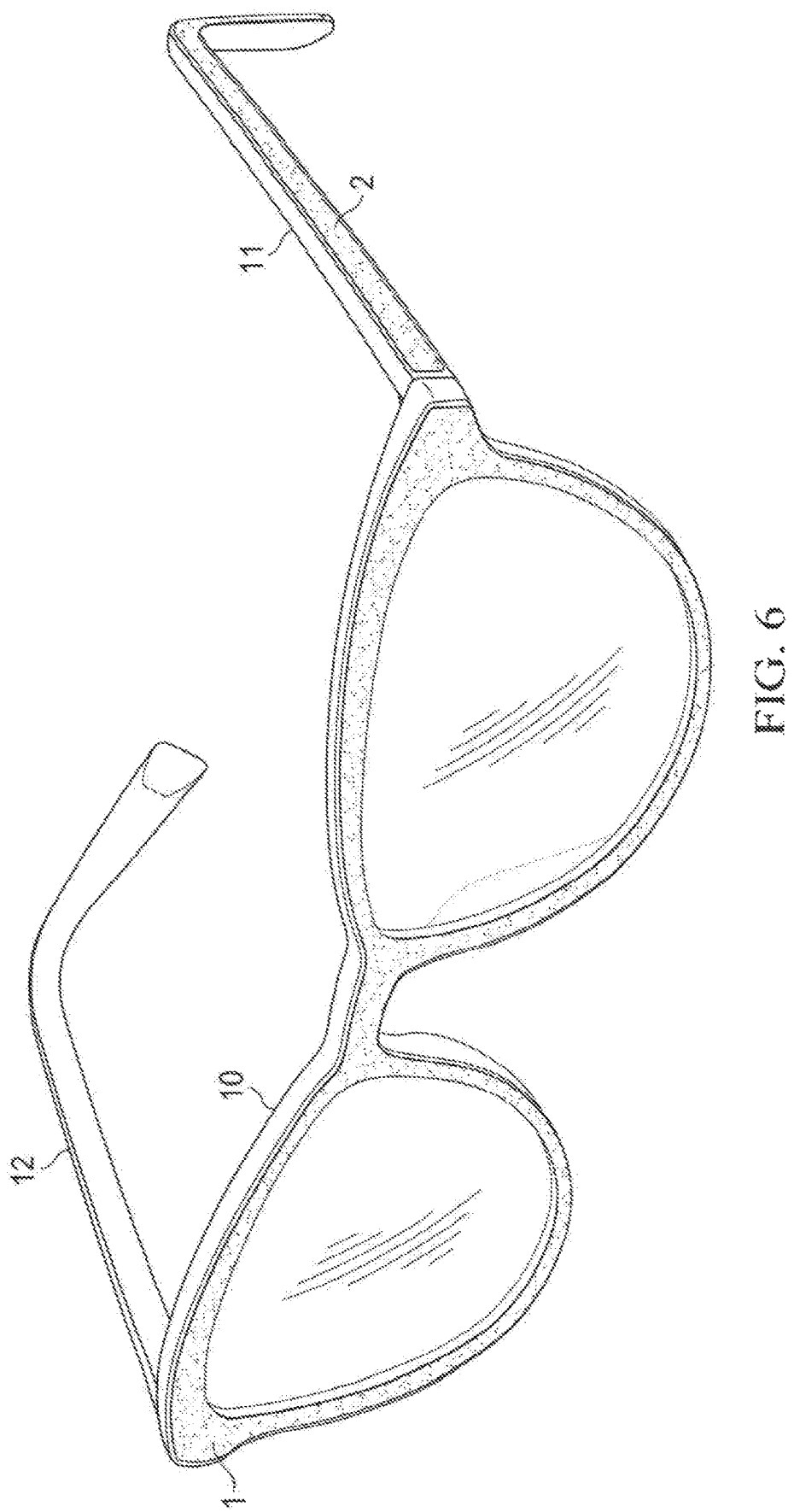
FIG. 6 shows a top perspective view of the eyewear appliqué system.

FIG. 6 shows a top perspective view of the eyewear appliqué system with appliqué and a standard eyeglasses frame. In this view, the surface of the frame front 10 with appliqué 1, left temple frame 11 with left temple appliqué 2, and right temple frame 12 are shown. Once the appliqué is produced by the appliqué application (as shown in FIG. 10), the user will use the release liner tab to remove the appliqué from the protective release liner or paper. The exposed appliqué may be pressed against the frame face and frame right temple to change the appearance of the frame. Adhesive material, not shown, facilitates the attachment of the appliqué and the frame.

Figure 7:
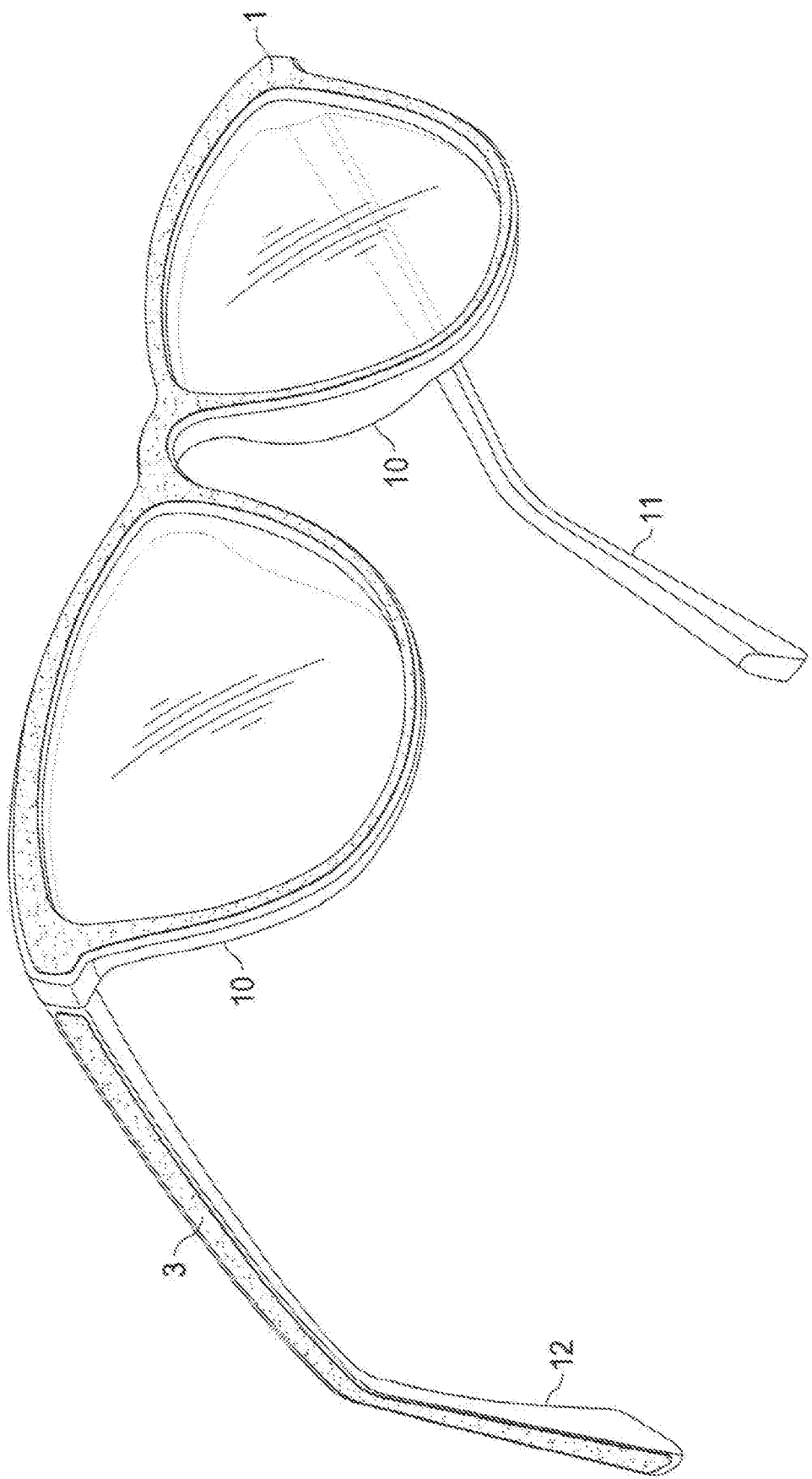
FIG. 7 shows a front perspective view of the eyewear appliqué system.

FIG. 7 shows a front perspective view of the eyewear appliqué system with appliqué and a standard eyeglasses frame. In this view, the surface of the frame face front 10 with appliqué 1, right temple frame 12 with right temple appliqué 3, and left temple 11 are shown. Once the appliqué is produced by the appliqué application (as shown in FIG. 10), the user will use the release liner tab to remove the appliqué from the protective release paper. The exposed appliqué may be pressed against the frame face and frame right temple to change the appearance of the frame. Adhesive material, not shown, facilitates the attachment of the appliqué and the frame.

Figure 8:
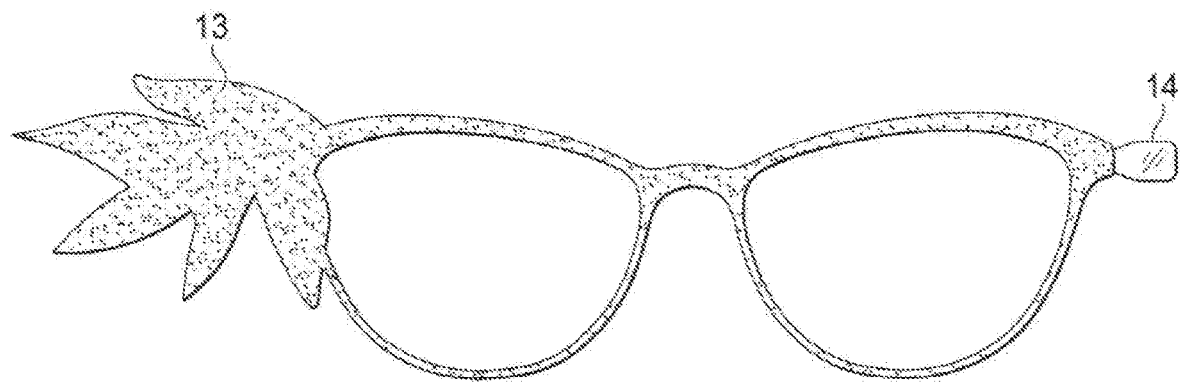
FIG. 8 shows a front view of the nonstandard eyewear appliqué system.

FIG. 8 shows a front view of the nonstandard eyewear appliqué system unique frame face appliqué and a release liner for this unique appliqué. A user desiring a nonstandard or unique frame shape, such as cat-eye or flower, can satisfy that desire by using the appliqué application to select the nonstandard design elements and generate the nonstandard appliqué to significantly alter the appearance of the user's standard frame. Depending on the design elements chosen by the user, the user may also alter the shape of their traditional frame to include a design element that may not be desirable or practice for daily frame wear. The appliqué system in this view is shown without a base frame. The release liner tab 14 is used to peel the release liner 15 from the adhesive layer on the back of the unique frame face appliqué 13. When the user is ready to apply this new appliqué 13 to the user's frame, the user would grasp the release liner tab 14 of the release liner 15, pull the release liner tab 14 to remove the release liner 15 and expose the back of the unique frame face appliqué 13 covered in adhesive (not shown). The user would then attach the unique or nonstandard appliqué to the user's standard frame.

Figure 9:
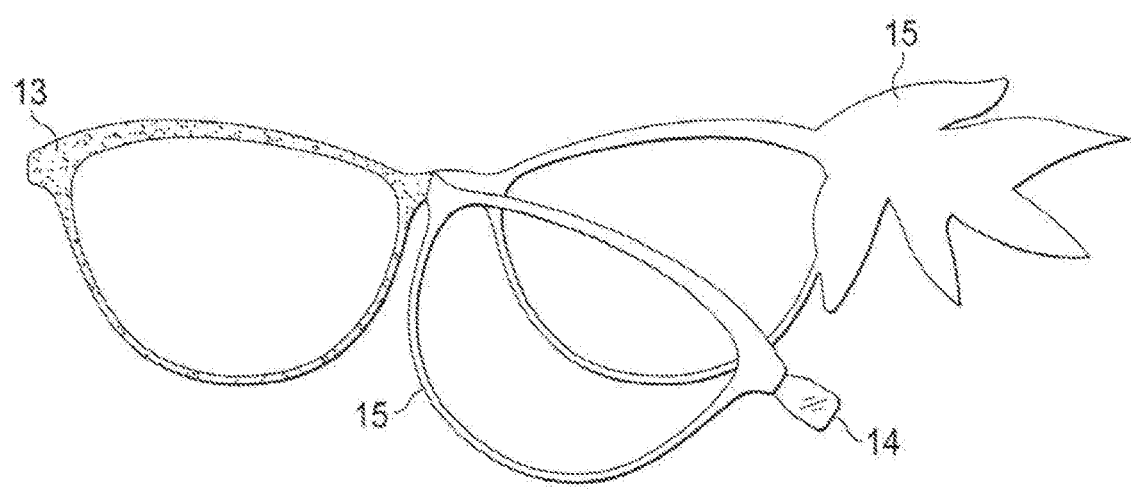
FIG. 9 shows a rear view of the nonstandard eyewear appliqué system.

FIG. 9 shows a rear view of the nonstandard eyewear appliqué system with protective release liner paper folded to expose the backside of the unique appliqué covered in adhesive (not shown). Once a user selects their personalization data and the appliqué is produced or manufactured, the user will pull the release liner tab 14 to expose the adhesive attached to the back of appliqué. In this view, the appliqué 13 is folded to expose the adhesive on the back side of the appliqué. Protective release liner paper 15 is opposite the adhesive to protect the adhesive until the user removes the protective release paper 15 prior to applying the appliqué 13 to the frame to alter the appearance of the frame. The protective release paper 15 may be in form of vinyl, plastic, coated paper, or a similar nonstick material. The adhesive may be emulsion acrylic adhesive, pressure-sensitive, water-based emulsion acrylic adhesive, tape, glue, polymer, hot melt adhesive or a similarly tacky substance to secure the appliqué to the frame.

FIG. 10 shows an overview of the eyewear appliqué application and method of generating the appliqués. The present invention describes two methods to generate and produce appliqués: by using data derived from a 3D scan file or using data derived from 2D images manually entered by a user. The present appliqué application stores a varied collection or library of appliqués compatible with various brands, sizes and styles of frames available in the marketplace. These appliqués are collected in the library via frame scan files for appliqués generated from user eyewear scans or user uploads as well as directly from eyewear manufacturers, who may share their CAD data files for their frames in distribution deals with the creators of the appliqué application. After a user accesses the appliqué application, the user would input the brand, size and style of their desired frame into the appliqué application. (10.A) The brand, size and style of frame is cross-referenced with the existing appliqués within the appliqué library. (10.B) However, if the appliqué application locates a frame brand, size and style match for a particular user already stored within the appliqué library (10.C2), then that user would forego the scanning process and move ahead to selection of specific appliqué design and cosmetic elements such as color, texture, shape and material. (10.H)

If there is no pre-stored match for the user's desired brand, size and style of frame in the appliqué library of the appliqué application, (10.C1) then the user would need to input their frame specifications into the appliqué application via a digital representation of the desired frames. (10.D) The user would first scan their chosen eyewear or eyeglasses frame using a three-dimensional (3D) scanner, 3D camera, 3D enabled-enabled smartphone application, or high-resolution camera (10.D) creating either a two-dimensional or three-dimensional frame scan file with the captured data ("frame surface rendering"). (10.E) This frame scan file or frame surface rendering would be saved and processed within that user's profile in the appliqué application. (10.E) if the user inputs a three-dimensional file, the appliqué application would process the frame scan file to derive/determine the surface specifications of the frame into a format readable by CAD (computer aided design). (10.F) The surface specification data of the frame is then imported into a CAD system to create an outline of the frame surface (10.F), which is used to create a vector appliqué file. (10.G) If the user instead inputs two-dimensional image(s), the appliqué application would instead use graphic design software to create an outline of the frame surface to create the vector appliqué file (10.F).

The resulting appliqué file is then exported to the STL file format (STL is an acronym for stereolithography, a file format native to STL CAD software from 3D Systems) or a similar file type, to be read by the manufacturing machine, (10.G) which creates an outline of the frame surface, which directs the manufacturing machine to cut or build material, depending on machine, along the outline of the frame surface or produce an injection mold or three-dimensional print. STL files describe only the surface geometry of a 3D object without representation of the user's personalization data such as color, texture, or other common CAD attributes. (10.H) Once the user selects the custom elements for the desired appliqué, such as color, texture, shape, material, along with a host of other design elements (10.H), the adhesive backed material will be created according to the specifications indicated by the vector file (10.I).

The manufacturing machine may be a laser cutter, die cutter, water jet cutter, flash cutter, plotter or other similar cutting mechanism, other subtractive manufacturing machine or an additive manufacturing machine such as a 3-D printer or injection molding machine. (10.I), which is used by the appliqué application to generate the appliqué from adhesive backed vinyl or some other amenable material. Once the appliqué has been created by the appliqué application, the newly generated appliqué may be hand embellished as needed (10.J) after which fulfillment (10.K) of the order may take place via shipping, customer pickup, delivery, or in-house production if the customer has the required machinery and appliqué application in their possession. Other technical features may be readily apparent to those skilled in the art from the above described figures and descriptions.

What is claimed is:

1. An eyewear alteration system, comprised of an eyeglass frame; and an eyeglass appliqué attachment, consisting of a length of material, an adhesive solution, a release liner, and a release liner tab, wherein said eyeglass appliqué attachment is cut in a shape selected from the group consisting of: frame face front, frame left temple leg, and frame right temple leg.

* * * * *